US010676011B2

(12) United States Patent
Ehrlich et al.

(10) Patent No.: US 10,676,011 B2
(45) Date of Patent: Jun. 9, 2020

(54) LOGISTIC RAIL ASSEMBLY FOR A COMPOSITE PANEL

(71) Applicant: Wabash National, L.P., Lafayette, IN (US)

(72) Inventors: Rodney P. Ehrlich, Monticello, IN (US); Ian Fox, West Lafayette, IN (US); Mark Ehrlich, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 57 days.

(21) Appl. No.: 15/896,186

(22) Filed: Feb. 14, 2018

(65) Prior Publication Data

US 2018/0229641 A1    Aug. 16, 2018

Related U.S. Application Data

(60) Provisional application No. 62/458,647, filed on Feb. 14, 2017.

(51) Int. Cl.
*B60P 7/08* (2006.01)
*B62D 33/04* (2006.01)
(Continued)

(52) U.S. Cl.
CPC .......... *B60P 7/0815* (2013.01); *B62D 29/005* (2013.01); *B62D 33/02* (2013.01);
(Continued)

(58) Field of Classification Search
CPC ....... B60P 7/0815; B62D 33/04; B62D 33/02; B62D 33/0207; B62D 29/005; B62D 33/046; B62D 27/002; B62D 27/023
(Continued)

(56) References Cited

U.S. PATENT DOCUMENTS 2,080,005 A    5/1937 Gilpin
2,123,441 A    7/1938 Schlesinger
(Continued)

FOREIGN PATENT DOCUMENTS

CA    772852 A    5/1967
DE    72564 C     4/1893
(Continued)

OTHER PUBLICATIONS

L. Hageman; Supplementary European Search Report; dated Feb. 10, 2000; 2 pages.

*Primary Examiner* — Stephen T Gordon
(74) *Attorney, Agent, or Firm* — Quarles & Brady LLP (57) ABSTRACT

Embodiments of the invention provide a logistic rail assembly configured to be installed within a composite panel of a vehicle, the composite panel being comprised of an inner sheet, an outer sheet, and a core member positioned between the inner and outer sheet, the logistic rail comprising a central portion including a plurality of apertures formed therein, the central portion defining a first thickness and first and second outer flange portions coupled to the central portion to position the central portion therebetween, wherein the first and second outer flange portions are configured to be coupled to the inner sheet of the composite panel, and wherein the first and second outer flange portions define a second thickness that is less than the first thickness.

9 Claims, 11 Drawing Sheets

(51) Int. Cl.
　　*B62D 29/00*　　　　(2006.01)
　　*B62D 33/02*　　　　(2006.01)
(52) U.S. Cl.
　　CPC ......... *B62D 33/0207* (2013.01); *B62D 33/04* (2013.01); *B62D 33/046* (2013.01)
(58) Field of Classification Search
　　USPC ........ 410/106, 110, 115, 113, 96; 296/186.1, 296/191; 52/309.4, 582.1
　　See application file for complete search history.

(56) References Cited

U.S. PATENT DOCUMENTS

| | | | |
|---|---|---|---|
| 3,102,498 A | 9/1963 | Dean | |
| 3,386,218 A | 6/1968 | Scott | |
| 3,393,920 A | 7/1968 | Ehrlich | |
| 4,043,274 A | 8/1977 | Snyder | |
| 4,045,927 A | 9/1977 | Diaz | |
| 4,104,840 A | 8/1978 | Heintz et al. | |
| 4,266,385 A | 5/1981 | Oehlert | |
| 4,656,809 A | 4/1987 | Wilson | |
| 4,685,721 A | 8/1987 | Banerjea | |
| 4,703,948 A | 11/1987 | Ehrlich | |
| 4,750,859 A | 6/1988 | Oren et al. | |
| 4,810,027 A | 3/1989 | Ehrlich | |
| 4,856,236 A | 8/1989 | Parker | |
| 4,904,017 A | 2/1990 | Ehrlich | |
| 4,936,069 A | 6/1990 | Hunter et al. | |
| 4,940,279 A | 7/1990 | Abott et al. | |
| 4,958,472 A | 9/1990 | Ehrlich | |
| 5,014,476 A | 5/1991 | Leslie et al. | |
| 5,022,208 A | 6/1991 | Ehrat et al. | |
| 5,042,395 A | 8/1991 | Wackerle et al. | |
| 5,052,848 A | 10/1991 | Nakamura | |
| 5,066,066 A | 11/1991 | Yurgevich et al. | |
| 5,112,099 A | 5/1992 | Yurgevich et al. | |
| 5,140,913 A | 8/1992 | Takeichi et al. | |
| 5,285,609 A | 2/1994 | Goad | |
| 5,433,053 A | 7/1995 | Tulloch | |
| 5,439,307 A | 8/1995 | Steinhilber | |
| 5,507,405 A | 4/1996 | Thomas et al. | |
| 5,584,527 A | 12/1996 | Sitter | |
| 5,628,158 A | 5/1997 | Porter | |
| 5,664,826 A | 9/1997 | Wilkens | |
| 5,673,524 A | 10/1997 | Gailey | |
| 5,774,972 A | 7/1998 | Ehrlich | |
| 5,860,693 A | 1/1999 | Ehrlich | |
| 5,938,274 A | 8/1999 | Ehrlich | |
| 5,992,117 A | 11/1999 | Schmidt | |
| 5,997,076 A | 12/1999 | Ehrlich | |
| 6,010,020 A | 1/2000 | Abal | |
| 2007/0110538 A1* | 5/2007 | Roush | B60P 7/0815 410/115 |
| 2013/0221702 A1* | 8/2013 | Katz | B62D 33/046 296/186.1 |

FOREIGN PATENT DOCUMENTS

| | | |
|---|---|---|
| DE | 143008 A3 | 7/1980 |
| DE | 3808750 A1 | 9/1989 |
| EP | 0607575 A1 | 7/1994 |
| FR | 2436222 A1 | 11/1980 |
| FR | 2574724 A1 | 6/1986 |
| GB | 946984 A | 1/1964 |
| GB | 2107258 A | 4/1983 |
| GB | 2158931 A | 3/1984 |
| SU | 1627443 A1 | 2/1991 |

* cited by examiner

LOGISTIC RAIL ASSEMBLY FOR A COMPOSITE PANEL

The present application claims the benefit of U.S. Provisional Patent Application No. 62/458,647 filed on Feb. 14, 2017, the contents of which are hereby incorporated by reference in their entirety.

BACKGROUND

Many storage trailers, including those for commercial trucking, consist of sidewalls and doors constructed from composite materials. Composite materials may have a plastic core disposed between two outer metal sheets. For example, Wabash National Corporation of Lafayette, Ind. makes DURAPLATE® composite panels that have a high-density polyethylene plastic core (HDPE) fastened between two high-strength, high-tension steel plates.

Cores of composite panels may be constructed from a plurality of structures including a network of cells. One such network of cells is made from an arrangement of hexagons that produce a honeycomb structure with alternating geometric structures and air pockets. In some instances, partially hollow cores use less plastic than completely solid cores, cutting down on material costs. Additionally, the partially hollow cores weigh less than completely solid cores and have higher density to strength ratios.

In order to construct the storage trailers, the composite panels may be attached to one another through the use of joining logistic rail assemblies. Further, it may be desired to include rails, bars, and the like within the storage trailers to provide a means for supporting cargo within the storage trailers. In order to accommodate the rails or bars, intermediate logistic rails may be coupled to the composite panels. The intermediate logistic rails may include apertures, e.g., A-slots, which may allow cables, rails, bars, buckles, and the like to be inserted therein. In this manner, the intermediate logistic rails act to provide support for the buckles. However, many intermediate logistic rails, when coupled to the composite panels, are offset from the composite panels and, as a result, disrupt the smooth exterior and/or interior surfaces of the tractor trailer assembly. Smooth interior or exterior surfaces of the storage trailers are desired to provide ease in loading and unloading of cargo, along with providing a smooth surface for application of advertising thereon. Therefore, there is a need for an intermediate logistic rail assembly which provides support for buckles (or connecting rails) and cargo without disrupting the smooth exterior and/or interior surfaces of the storage trailer.

SUMMARY

Some embodiments of the invention provide a logistic rail assembly configured to be installed within a composite panel of a vehicle, the composite panel being comprised of an inner sheet, an outer sheet, and a core member positioned between the inner and outer sheets, the logistic rail comprising a rail configured to be positioned within a portion of a composite panel, the rail including a base wall, first and second side walls coupled to and extending away from ends of the base wall, and first and second flanges extending inwardly from the first and second side walls, respectively, outer surfaces of the first and second flanges being positioned adjacent an inner surface of the outer sheet and a bonding plate coupled to an outer surface of the base wall and having a width that is greater than a width of the base wall such that third and fourth flanges are formed at ends of the bonding plate and the third and fourth flanges are bonded to an outer surface of the inner sheet, the rail and bonding plate having a combined first thickness at a point where the bonding plate is coupled to the rail and the third and fourth flanges including a second thickness that is less than the first thickness.

In other embodiments, a composite panel assembly for a vehicle is provided comprising a composite panel including an inner sheet, an outer sheet, and a honeycomb core member positioned therebetween and a logistic rail assembly. The logistic rail assembly includes a rail including a base wall and first and second side walls coupled to and extending away from ends of the base wall and a bonding plate coupled to an outer surface of the base wall and having a width that is greater than a width of the base wall such that first and second flanges are formed at ends of the bonding plate. The rail is positioned at least partially within the composite panel and the first and second flanges of the bonding plate are bonded to an outer surface of the inner sheet of the composite panel. Further, the rail and bonding plate have a combined first thickness at a point where the bonding plate is attached to the rail and the third and fourth flanges have a second thickness that is less than the first thickness.

In yet other embodiments, a method for installing a logistic rail assembly into a composite panel for a vehicle, the logistic rail assembly including a rail having a base wall and a first and second side walls coupled to and extending away from ends of the base wall and a bonding plate coupled to an outer surface of the base wall and having a width that is greater than a width of the base wall such that flanges are formed at ends of the bonding plate. The method includes the steps of removing a portion of the composite panel to form a cavity extending along a length of the composite panel, positioning at least a portion of the rail in the cavity, and bonding the flanges of the bonding plate to an inner sheet of the composite panel.

In other embodiments, a logistic rail assembly is configured to be installed within a composite panel of a vehicle, the composite panel being comprised of an inner sheet, an outer sheet, and a core member positioned between the inner and outer sheet, the logistic rail comprising a central portion including a plurality of apertures formed therein, the central portion defining a first thickness and first and second outer flange portions coupled to the central portion to position the central portion therebetween, wherein the first and second outer flange portions are configured to be coupled to the inner sheet of the composite panel, and wherein the first and second outer flange portions define a second thickness that is less than the first thickness.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
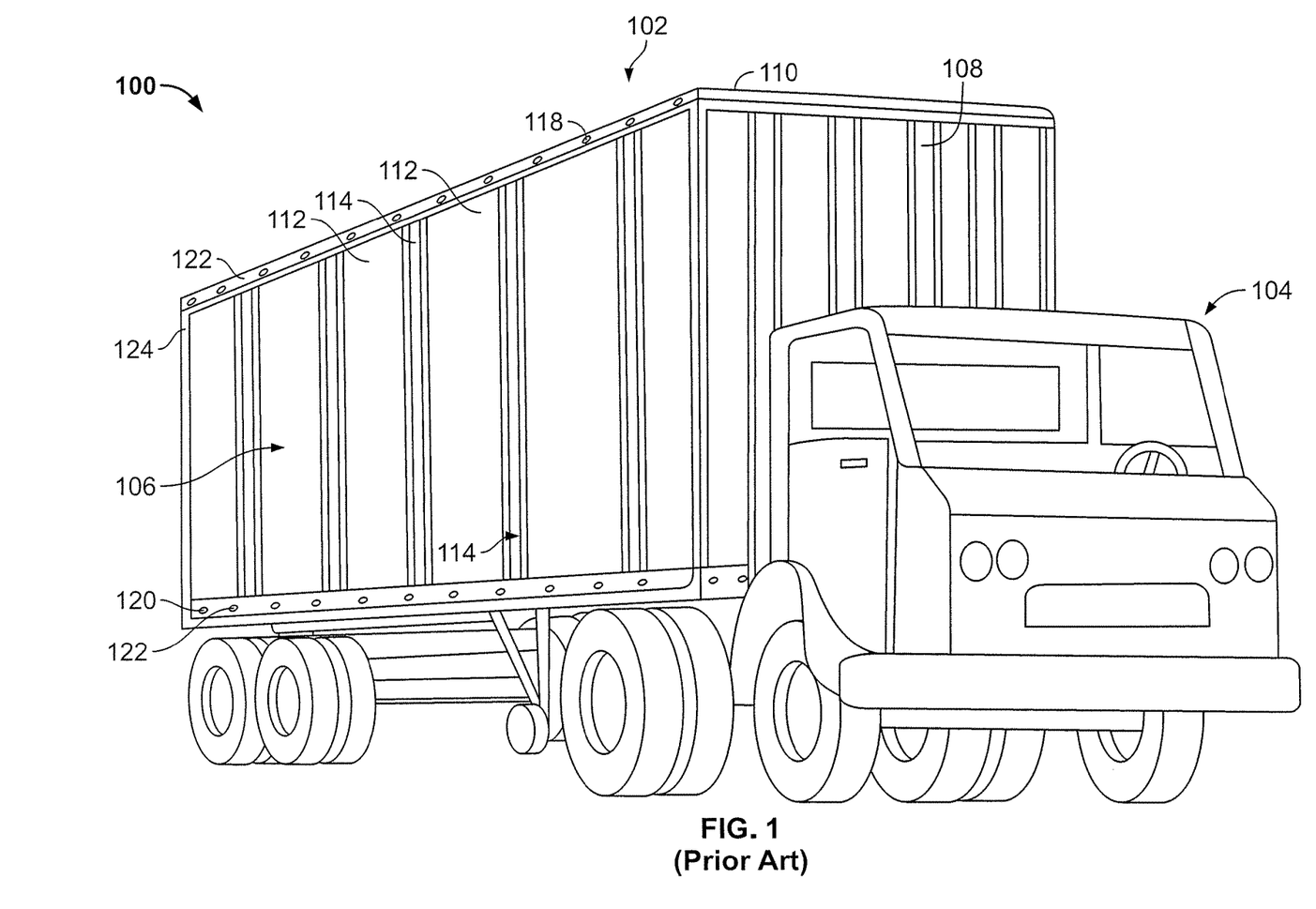
FIG. 1 is a perspective view of a trailer having sidewalls formed of a plurality of prior art composite panels.

FIG. 1 depicts a prior art tractor trailer assembly 100 consisting of a trailer 102 designed to carry cargo and a tractor 104 having an engine and a cab section. The trailer 102 is substantially rectangular and is defined by a roof assembly 110 and a floor assembly (not depicted) disposed opposite the roof assembly 110. The roof assembly 110 and the floor assembly are coupled to opposite sidewalls 106, a front end wall assembly 108, and a rear end wall assembly (not shown) including an overhead door. Optionally, the rear end wall assembly may include two doors mounted in a conventional manner such that the doors are hingedly coupled to and swing between open and closed positions. Further, the trailer 102 may be releasably coupled to the tractor 104 by conventional means, such as a fifth wheel, for example.

Portions of each sidewall 106, the front end wall assembly 108, and rear end wall assembly of the trailer 102 may be made from a plurality of composite panels 112. The composite panels 112 may be coupled to each other using a number of different fasteners and/or joint configurations. In one embodiment, the trailer 102 may have an intermediate and/or a joining logistic rail 114 including a logistics plate (not shown) and a splicing plate (not shown). The intermediate or joining logistic rail 114 is offset and protrudes outwardly from each sidewall 106 of the trailer 102. In some embodiments, the composite panels 112 may be coupled together along a vertical axis (i.e., when the composite panels are installed) using rivets, screws, welding adhesives or the like. Additionally, the composite panels 112 are coupled to a top and a bottom rail 118, 120 using a plurality of rivets 122. One or more composite panels 112 may also be coupled to one or more vertically oriented rails 124 of the trailer 102 using a fastener, such as rivets. The vertical rails 124 may be disposed between the panels 112 at various points along the length of the trailer 102 or at the perimeter of the trailer 102. Other joint configurations and other fasteners (including screws, bolts, nails, welding adhesives, and the like) may be used to couple adjacent composite panels 112 together, to the top and bottom rails 118, 120, and/or to the vertical rails 124.

Figure 2:
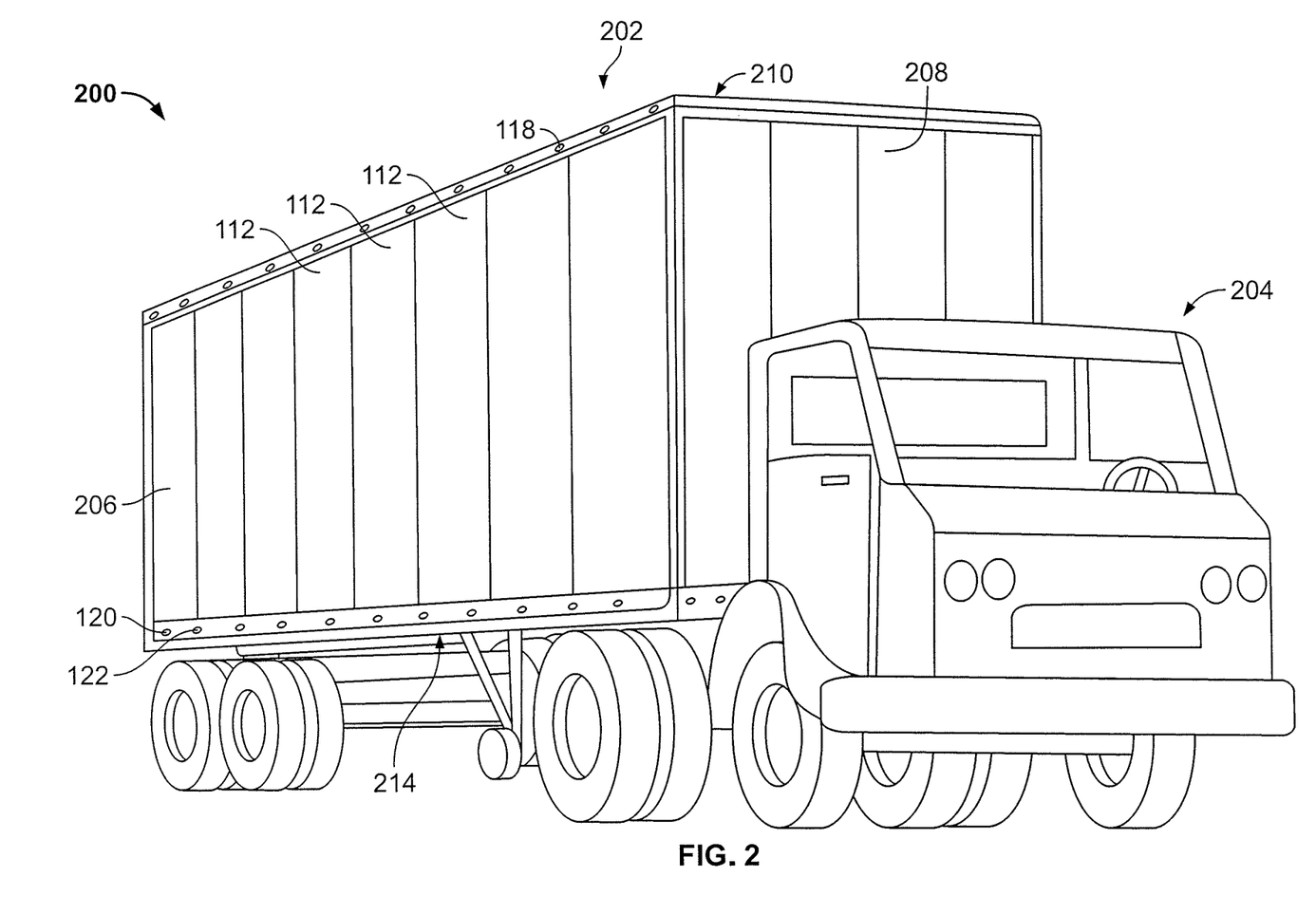
FIG. 2 is a perspective view of a trailer having sidewalls that include a plurality of composite panels with a plurality of logistic rail assemblies.
Figure 3:
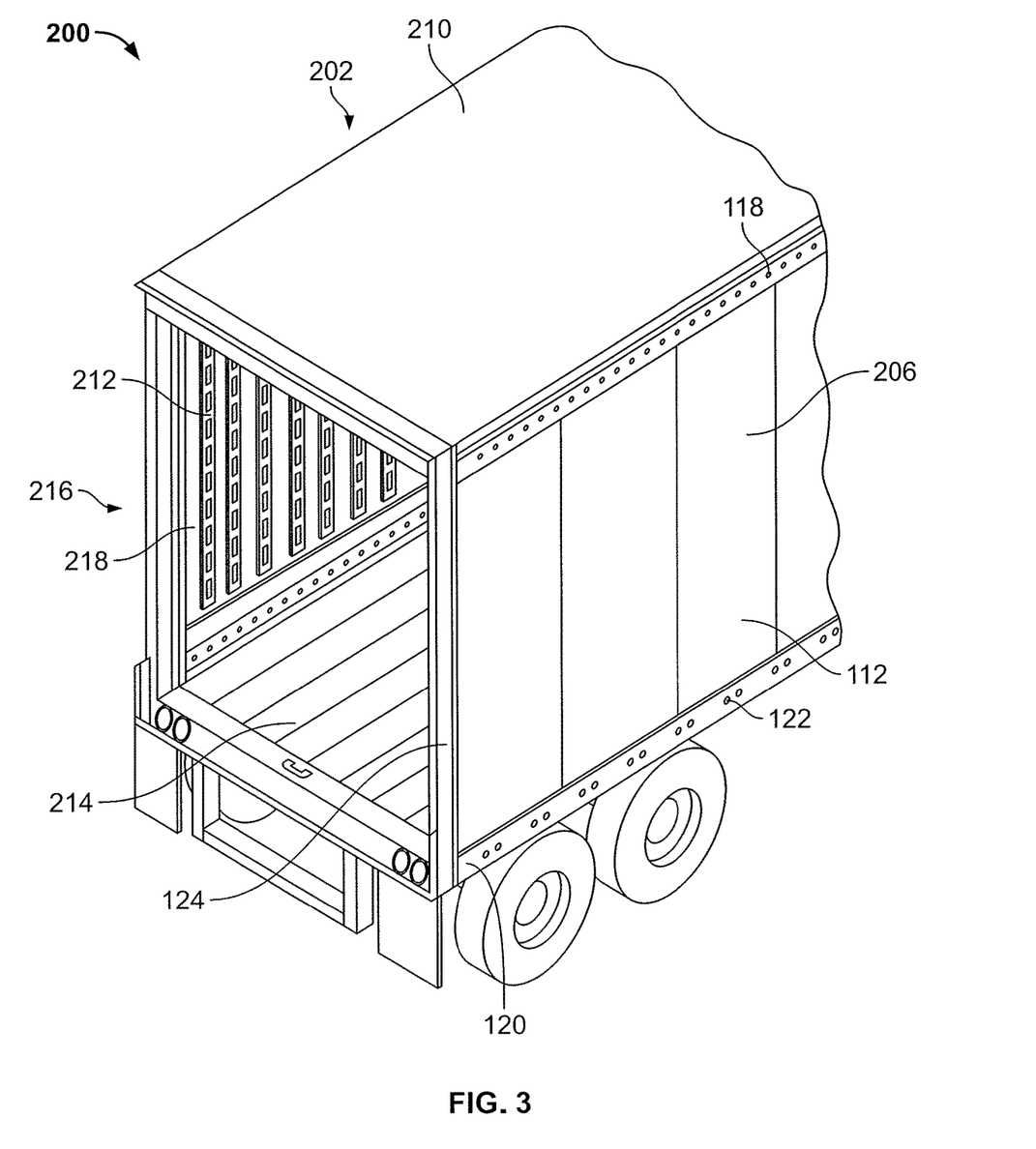
FIG. 3 is an isometric rear view of a portion of the trailer of FIG. 2 depicting the logic rail assemblies positioned on internal surfaces thereof.
Figure 4:
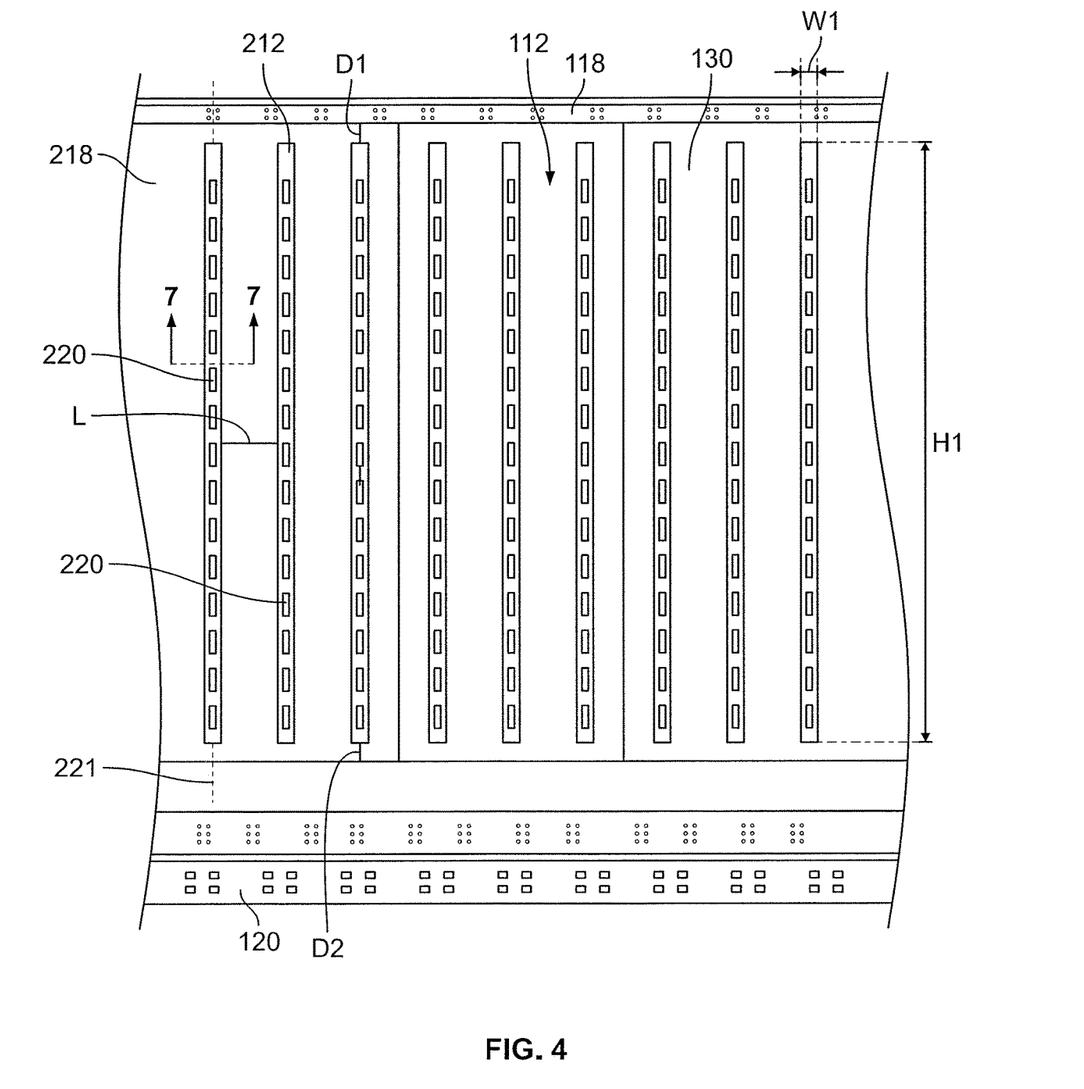
FIG. 4 is a front planar view of an inside wall or surface of the trailer of FIG. 3.

FIGS. 2-4 depict a tractor trailer assembly 200 with a trailer 202, a tractor 204, and a plurality of logistic rail assemblies 212 of the present invention. The trailer 202 is substantially rectangular and is defined by a roof assembly 210 and a floor assembly 214 disposed opposite the roof assembly 210. The roof assembly 210 and the floor assembly 214 are coupled to opposite sidewalls 206, a front end wall assembly 208, and a rear end wall assembly (not shown) including a door, for example, an overhead door. In this embodiment, each sidewall 206 and the front end wall assembly 208 is smooth. In particular, FIG. 3 depicts an interior area 216 of the tractor trailer assembly 200. The interior area 216 is defined by an interior surface 218 of the sidewalls 206, the roof assembly 210, the floor assembly 214, and the front end wall assembly 208. Further, the interior surface 218 of the sidewalls 206 include a plurality of logistic rail assemblies 212 for use as intermediate logistic strips. In this particular embodiment, the logistic rail assemblies 212 are positioned throughout the interior surface 218 of the sidewalls 206. Alternatively, the logistic rail assemblies 212 may be positioned along only a portion of the interior surface 218 of the sidewalls 206 and/or may be spaced at any suitable intervals from one another.

While the principles of the present invention are shown and described as being utilized with a trailer (that is attached to a tractor), the principles of the present invention may be utilized with any type of vehicle, for example, truck bodies, dry van or refrigerated trailers, refrigerated dry vans, flat beds, tanks, or any other vehicles.

FIG. 4 is a planar view of a portion of the interior surface 218 of one of the sidewalls 206 of the trailer 202. Each of the logistic rail assemblies 212 is substantially rectangular and defined by a height H1 and a width W1. The height H1 may be equal to a height of the composite panel 112 to provide a logistic rail assembly 212 that spans an entire height of the trailer 202. Alternatively, one or more of the logistic rail assemblies 212 may span a partial height of the composite panel 112. For example, one or more logistic rail assemblies 212 may have a height H1 relatively equal to ½ or ¼ of the height of the composite panel 112. Further, in this particular embodiment, the logistic rail assemblies 212 are relatively equal in size. However, it should be appreciated that the logistic rail assemblies 212 may have varying heights and/or widths. Still further, the any number of logistic rail assemblies 212 may be aligned vertically along the height of the composite panel 112 and each of the logistic rail assemblies may have any suitable and/or different number of slots (see element 220 in later figures).

In the depicted embodiment, the logistic rail assemblies 212 are equally spaced apart from one another a length L and spaced a distance D1 and D2 from the top and bottom rails 118, 120, respectively. In other embodiments, the length L between each logistic rail assembly 212 vary. In other words, it should be appreciated that the logistic rail assemblies 212 may be positioned within the inside of the sidewall 106 at varying distances and may be dependent on the particular tractor trailer assembly. Further, as best shown in FIG. 4, the logistic rail assemblies 212 include a plurality of apertures 220. In this embodiment, the apertures 220 are A-slot apertures that may allow for the insertion of a logistics horizontal load bar, a cable, or a rigid beam for use in securing cargo within the trailer 202. The logistic rail assemblies 212 are coupled to the composite panels 112 in a manner that will be described in more detail herein. Illustratively, the logistic rail assemblies 212 may also be positioned horizontally along a length of the trailer as well.

Figure 5:
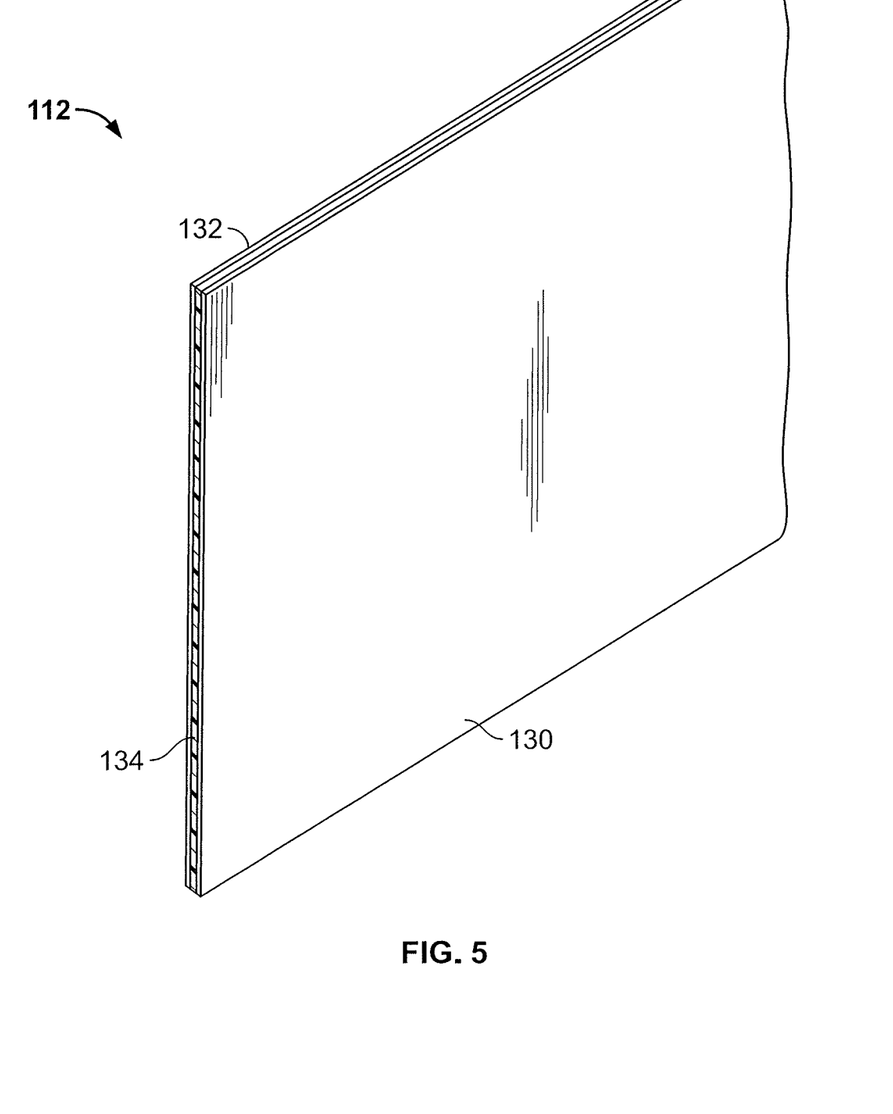
FIG. 5 is an isometric view of a portion of a composite panel having two outer sheets and an inner core.

FIG. 5 depicts one exemplary composite panel 112 that is provided in the form of an inner sheet 130, an outer sheet 132 disposed opposite the inner sheet 130, and a core member 134 positioned between the inner and outer sheets 130, 132. The inner and outer sheets 130, 132, respectively, may be formed from high-strength, high-tension steel plates, aluminum, other metals, and/or other alloys. The core member 134 is provided in the form of a thermoplastic material that will be described in more detail below.

The inner and outer metal sheets 130, 132 are bonded to the core member 134 by a suitable adhesive layer (not shown). In one embodiment, the sheets 130, 132 are bonded to the core member 134 by a suitable flexible adhesive bonding film such as, for example, modified polyethylene. It may be understood that other suitable adhesives or joining mechanisms may be used as well. When fully assembled, the outer sheets 132 of each panel 112 cooperate to form an exterior surface of the sidewalls 206, front end wall assembly 208, and rear end wall assembly (not shown) of the trailer 202, while the inner sheets 130 of each panel 112 cooperate to form the interior surface 218 of the sidewalls 206, front end wall assembly 208, and rear end wall assembly (not shown) of the trailer 202.

In the present embodiment, the inner sheet 130 and the outer sheet 132 are metal and can be formed of aluminum or full hard, high strength, high tension, galvanized steel. However, it should be understood that any suitable inner sheet and outer sheet may be used as well, including other metals, metal alloys, or plastics.

The core member 134 may be provided in a variety of different configurations with respect to the sheets 130, 132. In particular, in one embodiment, the core member 134 may be provided as a solid thermoplastic material that does not include portions that are hollowed, perforated, embossed metal, or honeycomb formed. Alternatively, the core member 134 may be provided as a foamed thermoplastic material. For instance, a gas, e.g., carbon dioxide, may be added during the extrusion of the core member 134 to produce a plurality of air bubbles interspersed within the thermoplastic material. In another embodiment, the core member 134 is provided as an at least partially hollow thermoplastic material that specifically includes portions that are hollowed, perforated, embossed metal, or honeycomb formed. In this embodiment, the core member 134 may comprise over 75%, or over 85%, or over 95% by volume of material that is not solid (i.e., partially hollow or substantially hollow).

While the principles of the present invention are described as being used for specific types of composite panels, it should be understood that the principles of the present invention may be utilized for any composite panel(s) regardless of the number of layers and/or material utilized for the different layers.

FIGS. 6A, 6B, 7, and 8 depict one embodiment of a logistic rail assembly 212 coupled to composite panels 112 of the tractor trailer assembly 200. The logistic rail assembly 212 includes a rail 222 and a bonding plate 224. The rail 222 is relatively C-shaped and includes a base wall 226 and first and second side walls 228a, 228b from ends of the base wall 226. Further, in this particular embodiment, the rail 222 has two inwardly extending flanges 230a, 230b that extend from distal ends of the first and second side walls 228a, 228b, respectively. The inwardly extending flanges 230a, 230b may be bonded to an inside of the outer sheet 132 of the panel 112. In some embodiments, the flanges 230a, 230b may not be bonded to the inside of the outer sheet 132 and may be positioned adjacent the outer sheet 132. Further, in this example, the base wall 226 is substantially flush with an inner surface 129 (FIG. 7) of the inner sheet 130 of the panel 112. Additionally, the first and second side walls 228a, 228b are smooth and in contact with at least a portion of the core member 134. In some embodiments, the first and second side walls 228a, 228b may be bonded to the core member 134 in any suitable manner. In other embodiments, the first and second side walls 228a, 228b may be spaced apart from the core member. In alternative embodiments, the logistic rail assembly 212 may not have the flanges 230a, 230b. For example, the flanges 230a, 230b may not be necessary in a lesser strength system where the honeycomb or core member 134 is adequate support for holding the inner sheet 130 and the outer sheet 132 together. However, in higher pulling load cases, the flanges 230a, 230b may be necessary to bond the outer sheet 132 to the inner sheet 130 using the logistic rail assembly 212. As such, the logistic rail assembly 212 may provide support in order to prevent the inner sheet 130 and the outer sheet 132 from separating from one another and from the core member 134, when the logistics rail assembly 212 is coupled to a buckle or other such means for supporting cargo within the storage area of the trailer.

In the embodiments shown in FIGS. 6A, 6B, 7, and 8, the rail 222 is positioned substantially within the composite panel 112. Further, the bonding plate 224 is positioned adjacent the rail 222 and is in contact with and substantially flush with an outer surface of the inner sheet 130. The bonding plate 224 is substantially rectangular and has dimensions corresponding to the height H1 and the width W1. In an illustrative embodiment, the bonding plate 224 has a width W1 that is greater than a width of the base wall 226 such that flanges 234 are formed at the ends of the bonding plate 224. In some embodiments, the flanges 234 are bonded, for example, by adhesive to the outer surface of the inner sheet 130. In addition, the bonding plate 224 and the rail 222 include the apertures 220, as mentioned above. The apertures 220 are substantially aligned with one another along a vertical axis 221. Apertures in both the rail 222 and the bonding plate 224 are aligned with one another to provide a continuous and uniform aperture extending through the bonding plate 224 and at least a portion of the rail 222. In an illustrative embodiment, the apertures 220 completely extend through the bonding plate 224 and the rail 222. One such aperture is an A-slot, which may be punched into the bonding plate 224 and the rail 222 prior to insertion into the composite panel 112 and after assembly of the bonding plate 224 to the rail 222. Alternatively, the apertures 220 may be punched into the bonding plate 224 and/or the rail 222 prior to adhering the bonding plate 224 to the rail 222. In this instance, the apertures 220 are relatively rectangular and provide slots where beams (not shown) may be inserted. Apertures 220 may be punched into the bonding plate 224 and the rail 222 separately or stack-punched after being tied together. While the bonding plate 224 and rail 222 are disclosed as being coupled to one another, in other illustrative embodiments, the bonding plate 224 and the rail 222 may be integral with one another.

Figure 6A:
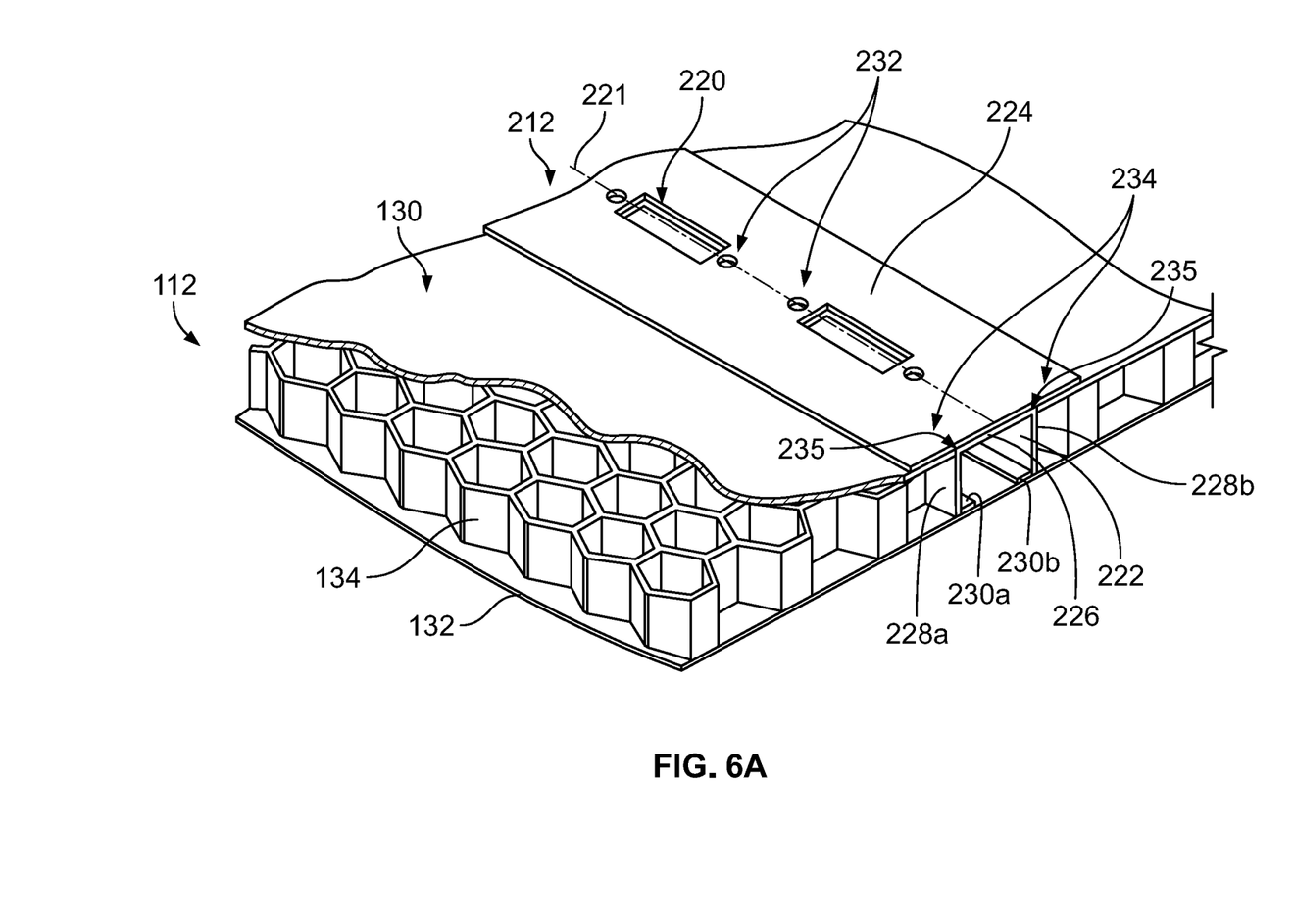
FIG. 6A is an isometric view of one embodiment of a logistic rail assembly installed within a composite panel having a honeycomb core and having a portion of an outer sheet thereof removed to depict an inner core thereof.
Figure 6B:
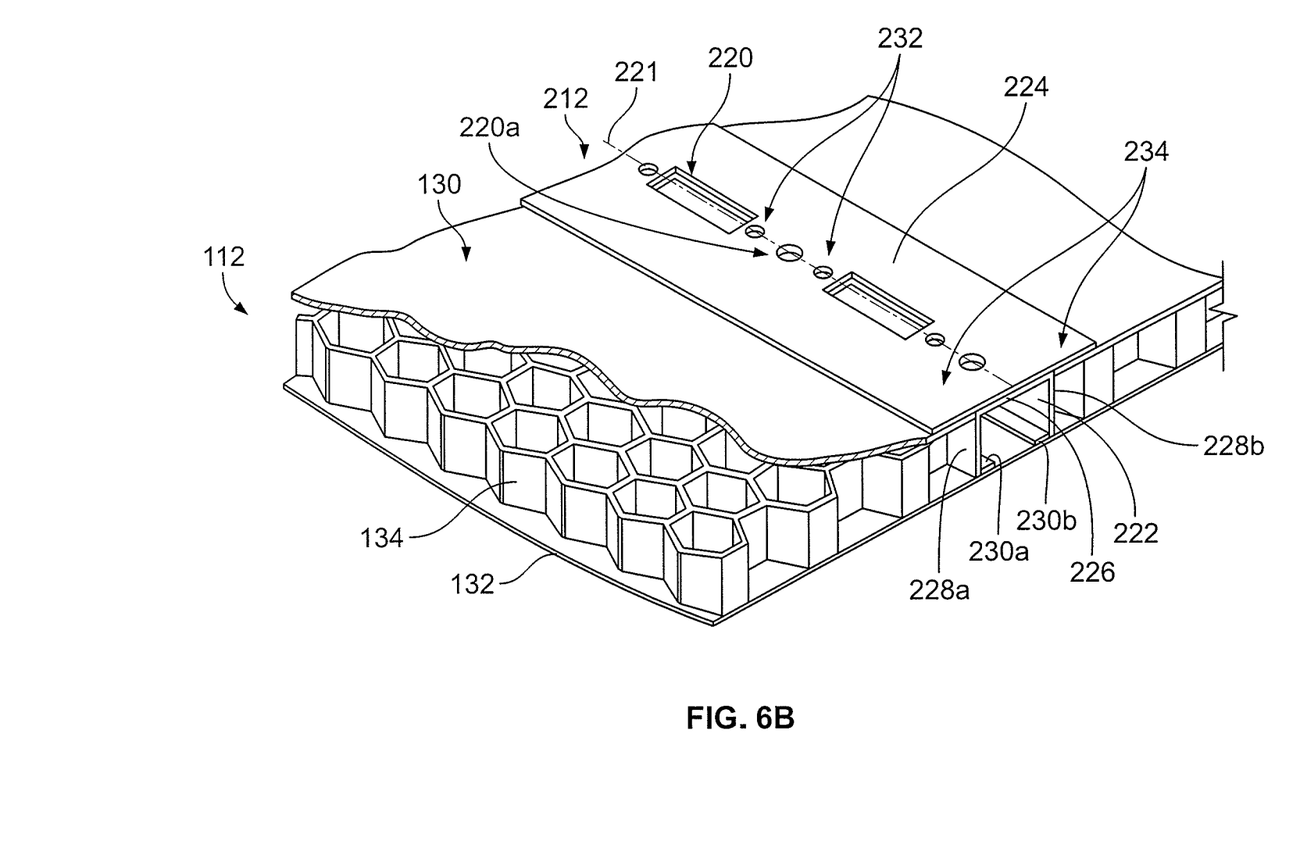
FIG. 6B is an isometric view of another embodiment of a logistic rail assembly installed within a composite panel having a honeycomb core and having a portion of an outer sheet thereof removed to depict an inner core thereof.
Figure 7:
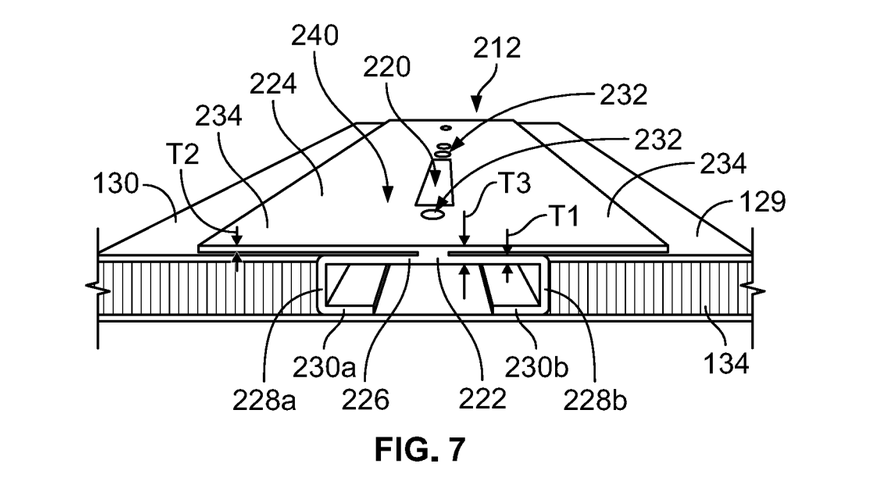
FIG. 7 is an isometric cross-sectional view of the embodiment of the logistic rail assembly of FIG. 6A taken generally along the lines 7-7 of FIG. 4.
Figure 8:
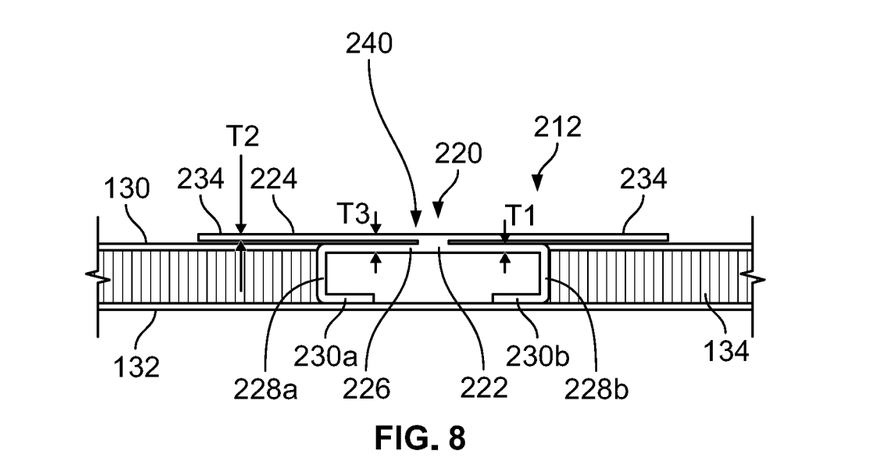
FIG. 8 is a cross-sectional view of the embodiment of the logistic rail assembly of FIG. 6A taken generally along the lines 7-7 of FIG. 4.

FIG. 6B illustrates another embodiment of the logistic rail assembly 212. In this particular embodiment, the logistic rail assembly 212 further includes a plurality of apertures 220a. The apertures 220a may be relatively circular (or of any other suitable shape). Further, similar to the apertures 220, the apertures 220a may provide an opening extending through the bonding plate portion 224 and at least a portion of the rail portion 222. In this specific embodiment, an "S" hook may be inserted into the apertures 220a. Further, the "S" hooks may be connected to a strap, rope, banding, or the like. However, although particular embodiments of the apertures 220 and the apertures 220a have be described above, it should be understood that the logistic rail assembly 212 may include a variety of apertures. In alternative embodiments, the apertures 220 and the apertures 220a may be a variety of shapes and sizes, and may be used for any suitable purpose(s). Specifically, the apertures may be unique to the logistic rail assembly and/or unique to the particular tractor trailer assembly.

Referring to FIGS. 6A, 6B, 7, and 8, the rail 222 and the bonding plate 224 are adhered to one other, for example, by a plurality of spot welds 232. The spot welds 232 may be located above and below the apertures 220 (or in any other suitable location) and act to ensure that the rail 222 and the bonding plate 224 are fused together, thereby making them perform as a single unit. In alternative embodiments, the bonding plate 224 and the rail 222 may be bonded together, rather than spot welded. In still further embodiments, the bonding plate 224 may be bonded to the rail 222 by welds positioned at locations 235 between outer edges of the rail and points on the bonding plate 224 where the flanges 234 begin. In yet other embodiments, the bonding plate 224 and the rail 222 may be bonded by rivets or any other suitable fastener. Further, the bonding plate 224 and the rail 222 may be adhered to the inner sheet 130, the outer sheet 132, and/or the core member 134 of the composite panel 112 by use of any suitable adhesive material, e.g., modified polyethylene. It may be understood that other suitable adhesives or joining mechanisms may be used.

The rail 222 and the bonding plate 224 may be made of a metal, a metal alloy, or the like using a roll form or press brake. In one embodiment, the rail 222 is provided, for example, as an 18 gauge steel skin with a thickness T1 approximately equal to 0.050 inches, as a 16 gauge steel skin with a thickness approximately equal to 0.0625 inches, or the thickness may be between about 0.03125 inches and about 0.125 inches. Additionally, the first and second sidewalls 228 have a length approximately equal to 0.367 inches, which may correspond to the relative thickness of the composite panel 112. As a result, in such an embodiment, the base wall 226 is relatively flush with the inner sheet 130 of the composite panel 112. Further, the bonding plate 224 may be a 22 gauge steel skin with a thickness T2 approximately equal to 0.03125 inches. In other embodiments, the thickness T2 may be between about 0.03215 inches and about 0.125 inches. The bonding plate 224 is preferably a thin material so that the inner sheet 130 is minimally interrupted and kept substantially smooth. As such, it is unnecessary to countersink the bonding plate.

The portion of the logistic rail assembly 212 where the bonding plate 224 overlaps the rail 222 may be at least 16 gauge or have a thickness T3 of at least 0.0625 inches. In some embodiments, the thickness T3 may between about 0.0625 inches and about 0.1875 inches. The thickness T3 may be at least twice and, in some case, at least three-times (or more), of the thickness T2, which provides for a thickened section where the slots 220 are to be formed (and where items will be attached to the logistic rail assemblies 212, which create increased forces at such locations).

In prior art logistic rails, for example, for use with Duraplate® panels made by Wabash National. LP, the thickness of portions of the logistic rails extending into the storage space of the trailer (e.g., the thickness of the bonding plate 224) may be eliminated or minimized by coining the inner surface of the side walls in order to allow at least a portion of the logistics rail to be recessed within the coined section. In, for example, honeycomb panels, logistic rail assemblies might not be able to be coined because coining may cause damaging compression to the structure of the honeycomb core. It is therefore desirable to provide a relatively thin bonding plate 224 (bonded to the interior surface of the side wall of the trailer) in order to minimize the extent to which the logistics rail assembly 212 extends away from the inner surface of the side wall of the trailer and inwardly into the storage space of the trailer.

Figure 9:
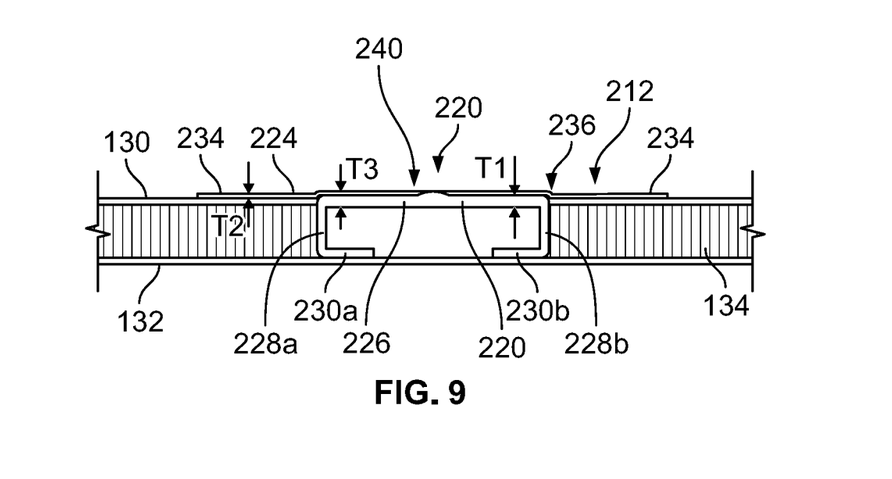
FIG. 9 is a cross-sectional view of an alternative embodiment of the logistic rail assembly taken generally alone the lines 7-7 of FIG. 4.

In an alternative embodiment, shown in FIG. 9, a larger dimension may be desired. Therefore, the first and second sidewalls 228 of the rail 222 have an approximate length equal to 0.40 inches. Consequently, the base wall 226 is not flush with the inner sheet 130 and, alternatively, the bonding plate 224 includes a bump or jog 236, relatively equal to 0.033 inches. However, this offset is minimal.

Figure 10A:
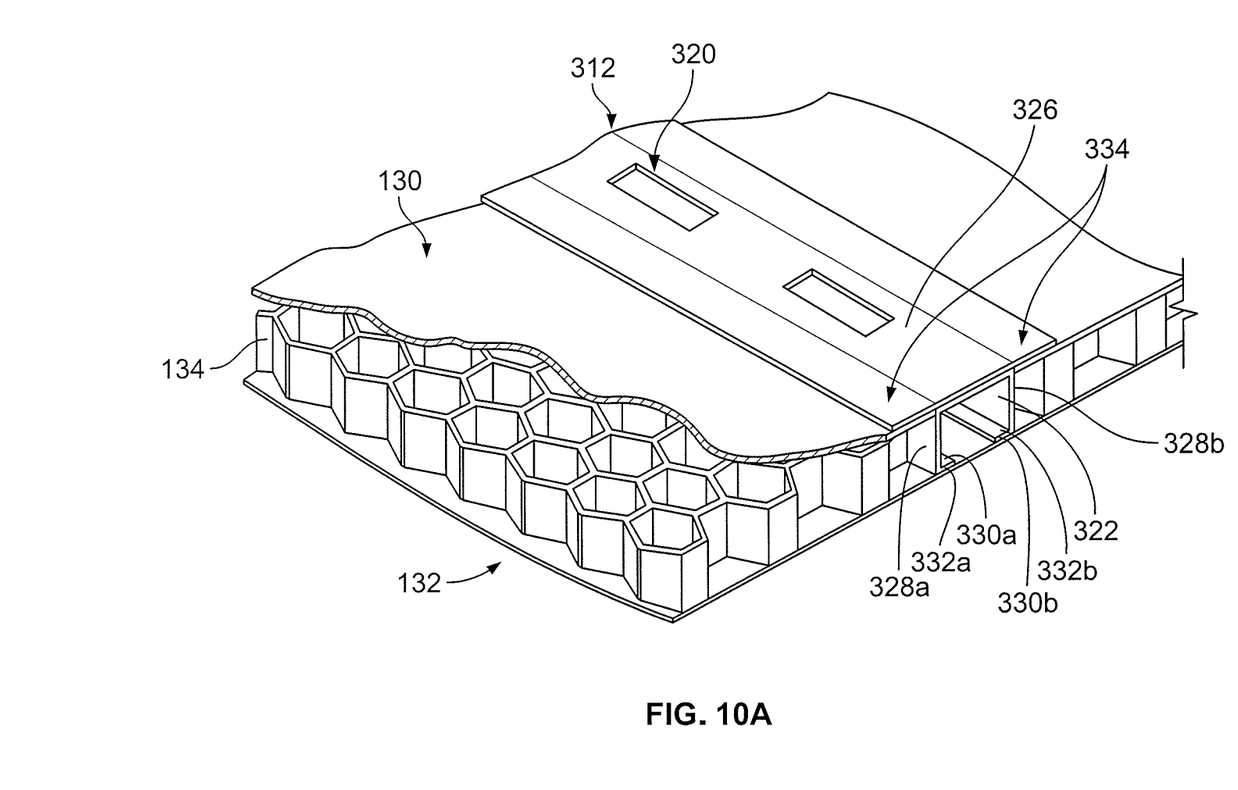
FIG. 10A is an isometric view of an alternative embodiment of a logistic rail assembly.
Figure 10B:
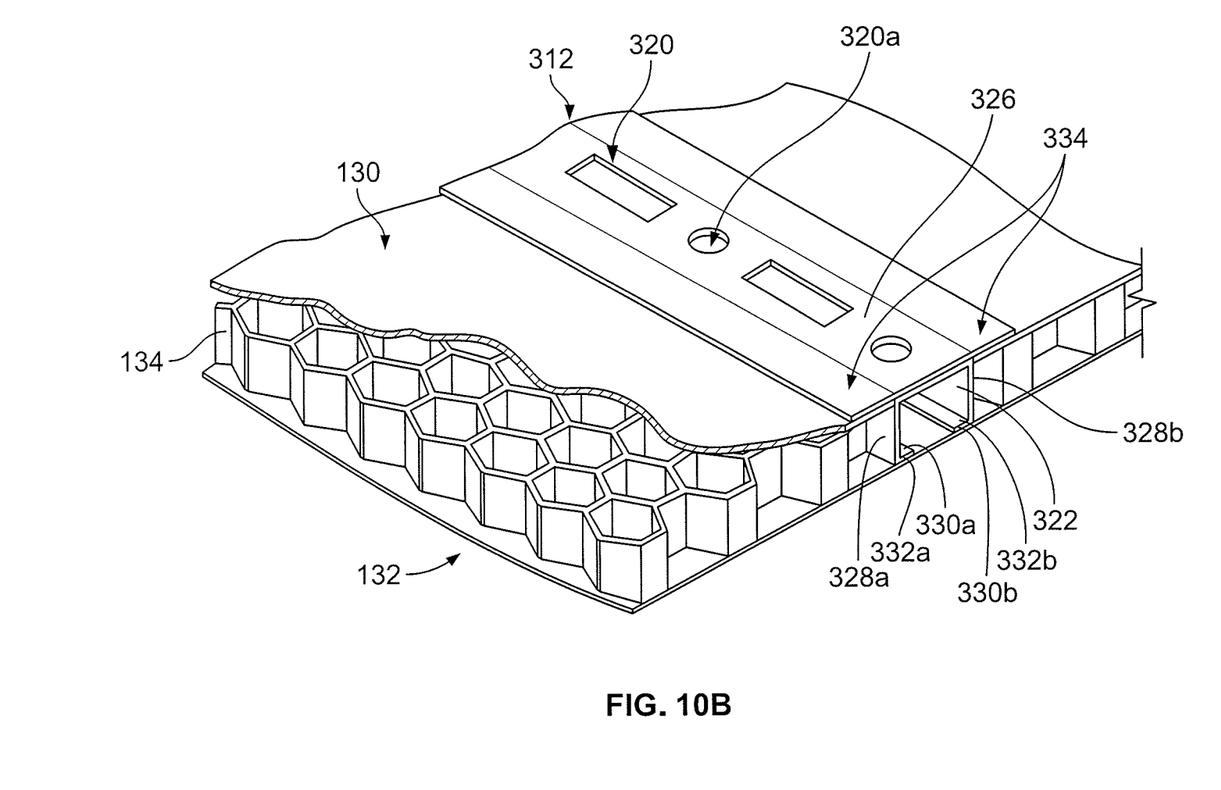
FIG. 10B is an isometric view of another embodiment of the alternative embodiment of the logistic rail assembly of FIG. 10A.
Figure 11:
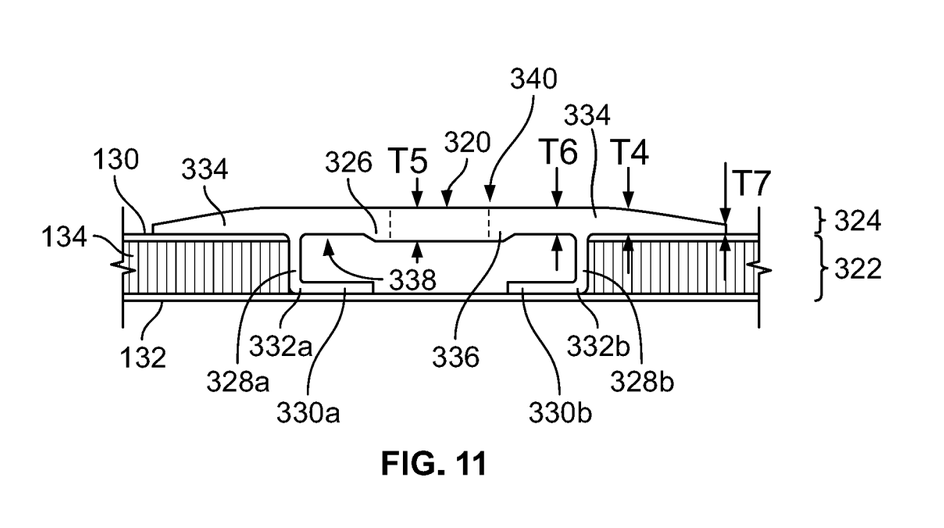
FIG. 11 is a cross sectional view of the alternative embodiment of the logistic rail assembly of FIG. 10A taken generally along the lines 7-7 of FIG. 4.

FIGS. 10A, 10B, and 11 depict another alternative embodiment of a logistic rail assembly 312. In this embodiment, the logistic rail assembly 312 is provided as a single structure. The logistic rail assembly 312 includes a rail portion 322 which is relatively C-shaped and includes a base wall 326 and a first and second sidewalls 328a, 328b extending therefrom. Further, the rail portion 322 may include inwardly extending flanges 330 that extend inwardly from distal ends 332a, 332b of the first and second sidewalls 328a, 328b. The distal ends 332a, 332b of the first and second sidewalls 328a, 328b and the flanges 330a, 330b may be adhered to the inside of the outer sheet 132 of the composite panel 112. In alternative embodiments, the logistic rail assembly 312 may not have the flanges 330a, 330b. For example, the flanges 330a, 330b may not be necessary in a lesser strength system where the honeycomb or core member 134 is adequate support for holding the inner sheet 130 and the outer sheet 132 together. However, in higher pulling load cases, the flanges 330a, 330b may be necessary to bond the outer sheet 132 to the inner sheet 130 using the logistic rail assembly 312. As such, the logistic rail assembly 312 may provide support in order to prevent the inner sheet 130 and the outer sheet 132 from separating from one another and from the core member 134. The logistic rail assembly 312 further includes a bonding plate portion 324 including the base wall 326 and first and second flanges 334 extending outwardly therefrom. The flanges 334 have a slight downward slope or taper (e.g., in the form of a chamfer). Therefore, the thickness of the flanges 334 decreases as they extend outwardly from the base wall 326. This taper helps to minimize the offset from the logistic rail assembly 312 present on the inside of the composite panel 112. Further, the flanges 334 are in contact with and adhered to the inner sheet 130 of the composite 112.

The logistic rail assembly 312 of FIGS. 10A, 10B, and 11 further includes a plurality of apertures 320. As mentioned, the apertures 320 provide a continuous and uniform opening extending through the bonding plate portion 324 and at least a portion of the rail portion 322. In an illustrative embodiment, the apertures 320 completely extend through the bonding plate portion 324 and the rail portion 322. One such aperture is an A-slot, which may be punched into the logistic rail assembly 312 prior to insertion into the composite panel 112. The apertures 320 provide support for cables or rigid beams which may be used to hold cargo. The base wall 326 may further include a bump or raised portion 336 on an inside face 338 thereof. The bump 336 acts to increase the thickness of the base wall 326. In particular, the bump 336 is axially aligned with the apertures 320 to provide support for slot performance.

FIG. 10B illustrates another embodiment of the logistic rail assembly 312. In this particular embodiment, the logistic rail assembly 312 further includes a plurality of apertures 320a. The apertures 320a may be relatively circular (or of any other suitable shape). Further, similar to the apertures 320, the apertures 320a may provide an opening extending through the bonding plate portion 324 and at least a portion of the rail portion 322. In this specific embodiment, an "S" hook may be inserted into the apertures 320a. The "S" hooks may be connected to a strap, rope, banding, or the like. However, although particular embodiments of the apertures 320 and the apertures 320a have be described above, it should be understood that the logistic rail assembly 312 may include a variety of apertures. Specifically, the apertures may be unique to the logistic rail assembly and/or unique to the particular tractor trailer assembly. Therefore, the apertures 320 and the apertures 320a may be a variety of shapes and sizes, and may be used for any suitable purpose(s).

Referring to FIGS. 10, 10B, and 11, the logistic rail assembly 312 may have a variety of sizes and shapes. For example, the size and shape of the logistic rail assembly 312 may be dependent upon the composite panel 112 into which the logistic rail assembly 312 may be installed. In one embodiment, the first and second sidewalls 328a, 328b and the flanges 330a, 330b have a thickness approximately equal to 0.10 inches. The first and second sidewalls also have a height of approximately 0.433 inches. Further, the base wall 326 has a thickness T5 relatively equal to 0.130 inches, where the bump or protuberance 336 is present, and an approximate thickness T6 equal to 0.113 inches, elsewhere. Additionally, the flanges 334 may have a thickness T4 of 0.113 inches which tapers to a thickness T7 relatively equal to 0.060 inches.

Accordingly, in the illustrative embodiments described herein, a central portion 240, 340 of any of the logistics rail assemblies 212, 312 described herein surrounding the slots 220, 320 and holes 232 configured to receive a buckle or other connecting portion therein is thicker than the portion of the logistics rail assembly 212, 312 that is coupled to the inner surface of the side wall of the trailer. As such, the thicker central portion 240, 340 is able to within stand loads placed therein due to the connecting portions coupled thereto while the amount by which the flanges 234, 334 coupled to the inner surface of the side wall of the trailer extend into the interior of the storage area of the trailer is minimized.

In illustrative embodiments the rail portion 322 and the bonding plate portion 324 may be adhered to the outer sheet 132 and inner sheet 130, respectfully, through the use of an adhesive (not shown), such as a suitable flexible adhesive bonding film, e.g., modified polyethylene. It may be understood that other suitable adhesives or joining mechanisms may be used as well.

The logistic rail assembly 212 and the logistic rail assembly 312 may be inserted into the composite panels 112 of the tractor trailer assembly 200 by similar methods. For example, the logistic rail assembly 212 and the logistic rail assembly 312 may be installed into a composite panel 112 of a tractor trailer assembly 200 by first removing a portion of the composite panel 112 to form a cavity extending a length (in a vertical direction when installed) through the composite panel 112. In an illustrative embodiment, a portion of the inner sheet 130 and the core member 134 is completely removed. However, the outer sheet 132 remains intact. Thus, the sidewalls 206 of the tractor trailer assembly 200 are not interrupted by the logistic rail assemblies and have a smooth surface. This may be desired for instances where it is desired to place advertising on the sidewalls 206 or front end wall assembly 208. Next, the rail 222 or the rail portion 322 is positioned at least partially within the cavity. Further, the rail 222 or the rail portion 322 may be bonded to the outer sheet 132 of the composite panel 112.

Next, in regard to the logistic rail assembly 212, the bonding plate 224 is positioned so that the apertures 220 of both the bonding plate 224 and the rail 222 align to provide a continuous and uniform opening therethrough. Then the bonding plate 224 may be bonded to the inner sheet 130 of the composite panel 112 by the use of the aforementioned adhesive and to the rail 222 by the use of the spot welds 232. In regard to the logistic rail assembly 312, once the rail portion 322 is positioned at least partially within the cavity, the flanges 334 may be bonded to the inner sheet 130 of the composite panel 112.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A logistic rail assembly configured to be installed within a composite panel of a vehicle, the composite panel being comprised of an inner sheet, an outer sheet, and a core member positioned between the inner and outer sheets, the logistic rail comprising:

a rail configured to be positioned within a portion of a composite panel, the rail including a base wall, first and second side walls coupled to and extending away from ends of the base wall, and first and second flanges extending inwardly from the first and second side walls, respectively, outer surfaces of the first and second flanges being positioned adjacent an inner surface of the outer sheet; and a bonding plate coupled to an outer surface of the base wall and having a width that is greater than a width of the base wall such that third and fourth flanges are formed at ends of the bonding plate and the third and fourth flanges are bonded to an outer surface of the inner sheet;

wherein the rail and bonding plate have a combined first thickness at a point where the bonding plate is coupled to the rail and the third and fourth flanges have a second thickness that is less than the first thickness.

2. The logistic rail assembly of claim 1, wherein the bonding plate is coupled to the outer surface of the base wall of the rail by welding or rivets.

3. The logistic rail assembly of claim 1, wherein the bonding plate is integral with the outer surface of the base wall of the rail.

4. The logistic rail assembly of claim 1, wherein the first thickness is between about 0.0625 inches and about 0.1875 inches and the second thickness is between about 0.03125 inches and about 0.125 inches.

5. The logistic rail assembly of claim 1, wherein the first thickness is at least twice the second thickness.

6. The logistic rail assembly of claim 1, further including a protuberance extending inwardly from the base wall where the bonding plate is coupled to the base wall.

7. The logistic rail assembly of claim 1, further including a slot formed through at least the bonding plate and the base wall of the rail.

8. The logistic rail assembly of claim 1, wherein the first and second flanges are bonded to the inner surface of the outer sheet.

9. The logistic rail assembly of claim 1, wherein the third and fourth flanges have a downward slope as each of the third and fourth flanges extends away from the rail toward ends of the third and fourth flanges.

* * * * *